Oct. 8, 1963     D. E. FOLEY     3,106,696
INFORMATION DISPLAY MEANS
Filed Dec. 27, 1960     11 Sheets-Sheet 1

INVENTOR
DANIEL ELMORE FOLEY
BY
ATTORNEY

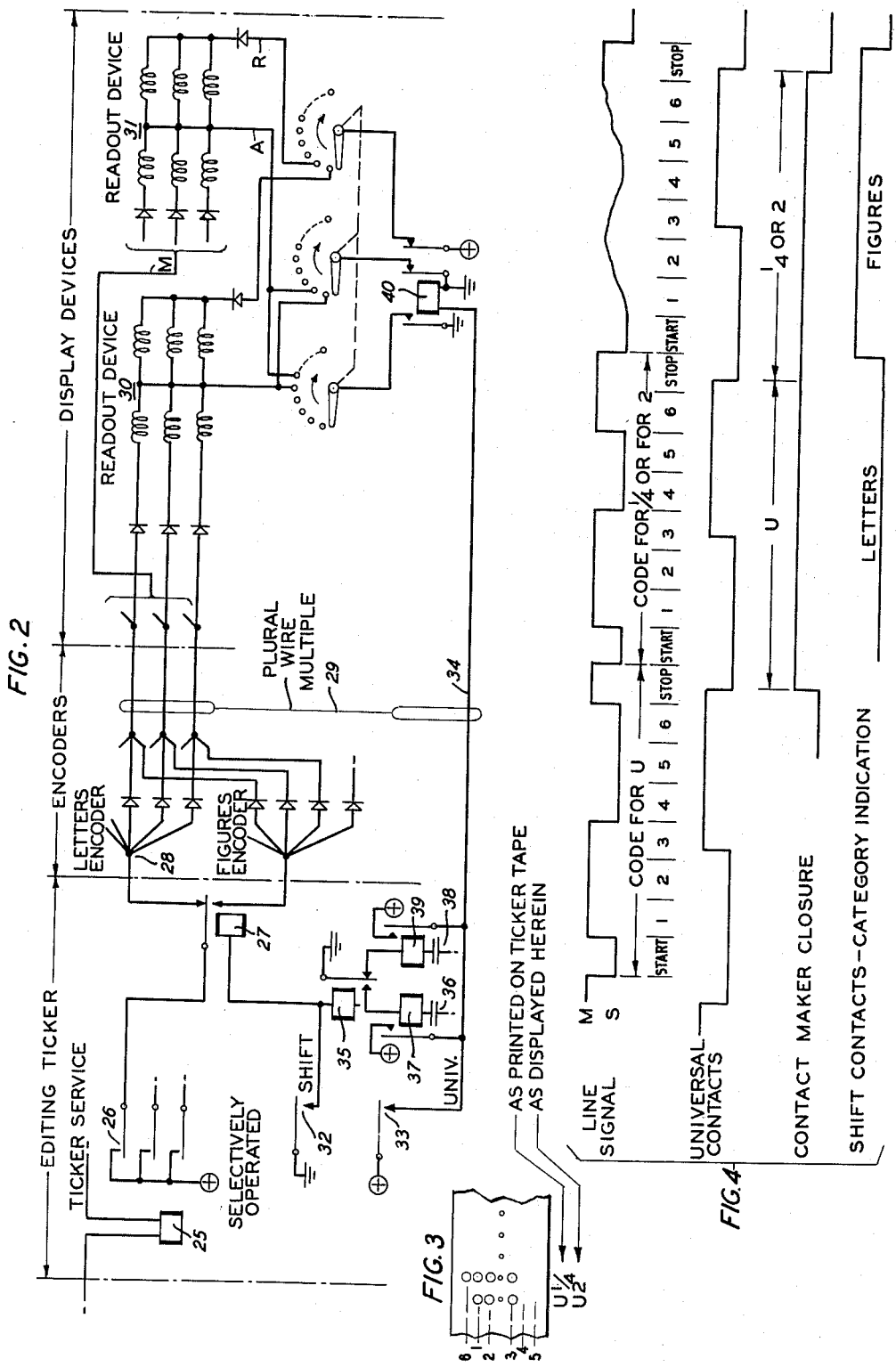

Oct. 8, 1963        D. E. FOLEY        3,106,696
INFORMATION DISPLAY MEANS
Filed Dec. 27, 1960        11 Sheets-Sheet 3
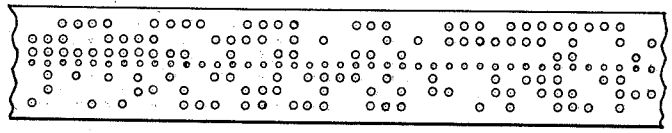
FIG. 5
FIG. 6
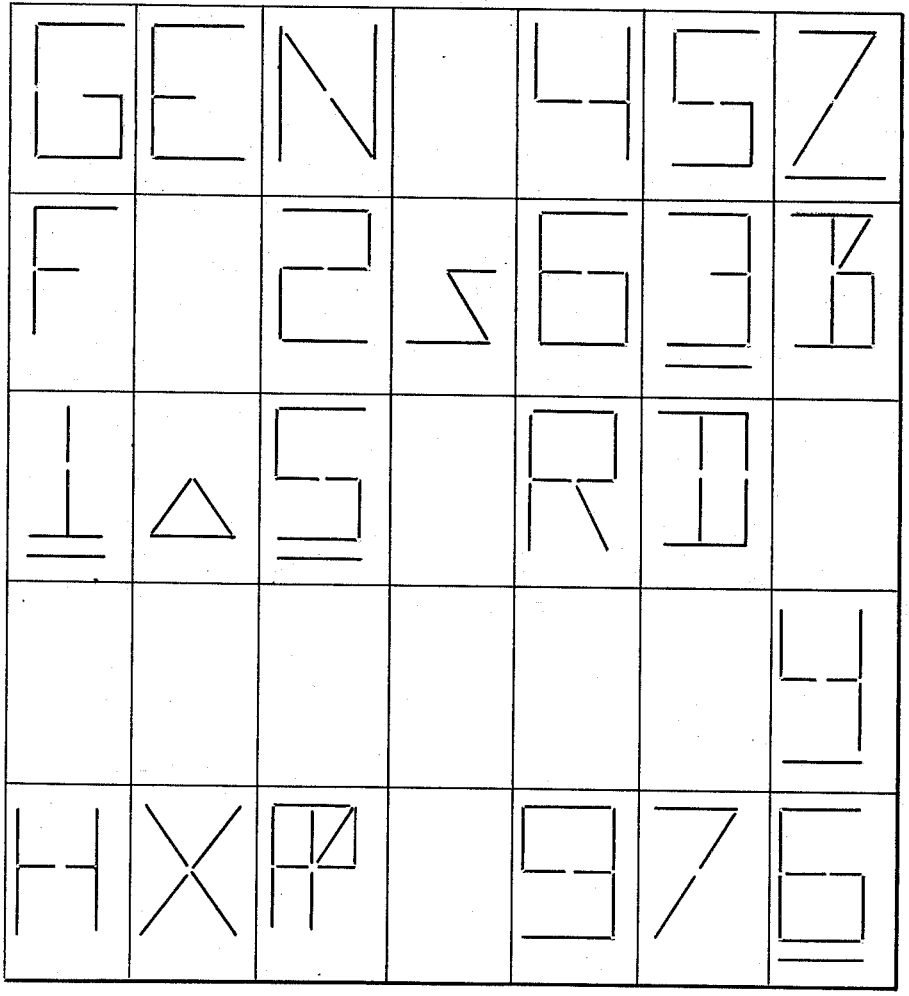
FIG. 7

Oct. 8, 1963

D. E. FOLEY 3,106,696

INFORMATION DISPLAY MEANS

Filed Dec. 27, 1960

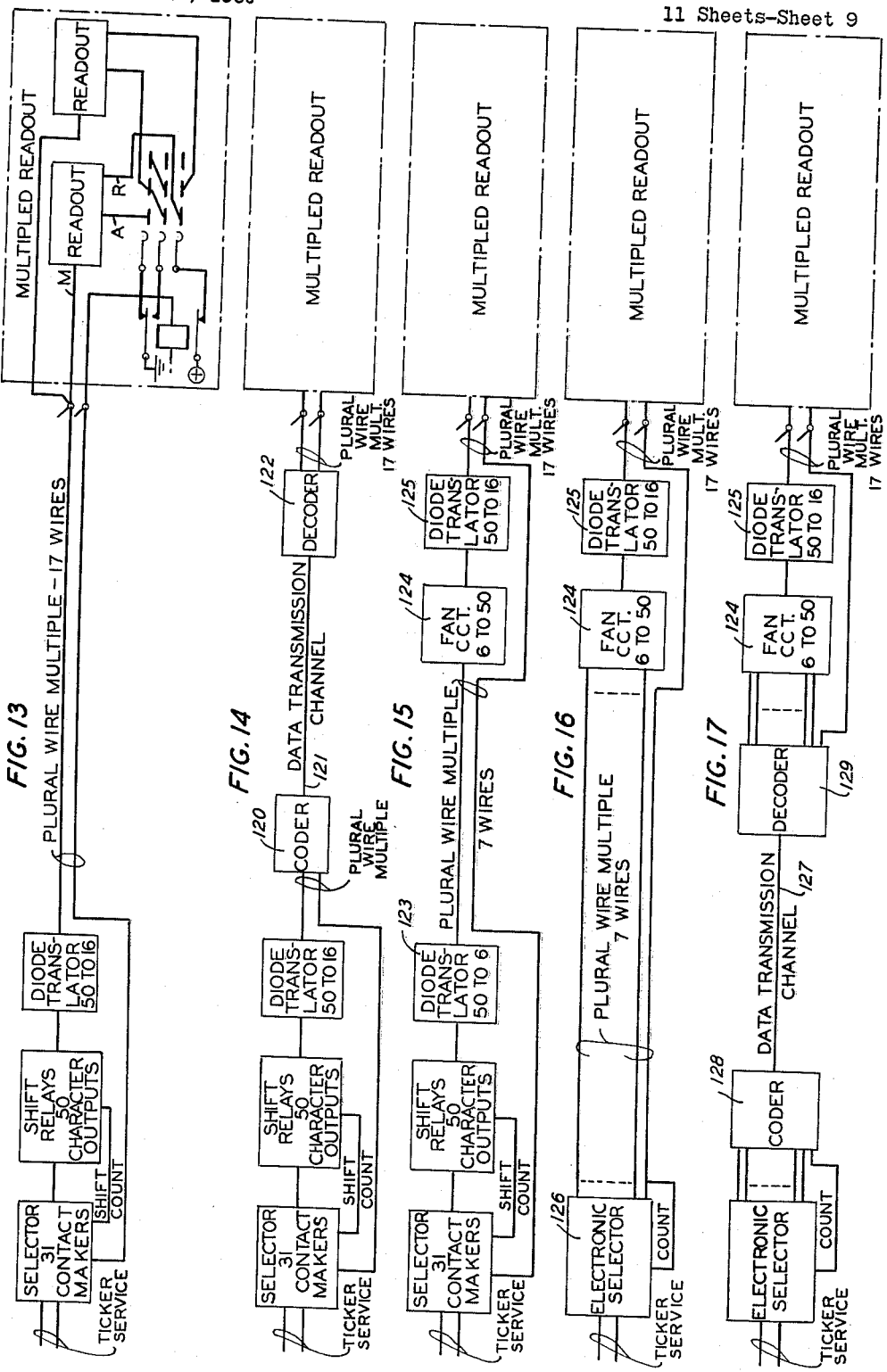

United States Patent Office 3,106,696
Patented Oct. 8, 1963

3,106,696
INFORMATION DISPLAY MEANS
Daniel Elmore Foley, Nutley, N.J., assignor, by mesne assignments, to William F. Hogan, Scarsdale, N.Y.
Filed Dec. 27, 1960, Ser. No. 78,565
9 Claims. (Cl. 340—154)

This invention relates to display means and particularly to means for disseminating, posting and maintaining the display of current information in the form of symbols including alphabetic and numeric delineations at distant locations.

The object of the invention is to provide electrical means for operating indicators, each made of a plurality of electro-mechanically operated bars or linear display means arranged in a matrix whereby selective operation thereof will display a synthesized character, such as a letter of the alphabet or a numerical digit, or even a special character having a known and predetermined information quotient.

A specific object of the invention is to provide display means adapted for use in such a system as that disclosed in Patent 2,871,462, issued January 27, 1959, to Eggensperger and Foley, the principal object of which is to display information being constantly transmitted over a service wire for the operation of the so-called "tickers" used in brokers' offices to supply information printed on "ticker tape."

The said specific object differs from the object of the Eggensperger and Foley system in that, in the former case, the quotation is guided into a specific display area already marked for identification of a particular commodity whereas in the present case each quotation is displayed in full, both the identification of the commodity and the price thereof being posted in the manner of the ticker tape.

In accordance with this object, a bank of display units is provided wherein the units are sequentially approached and set from a transmission line, such as that provided for ticker service. Such display units may be mounted in a cabinet, the face of which may be visible to the personnel in a broker's office and which will constantly display a given amount of the last transmitted information, such given amount depending on the number of display units employed and corresponding to the last given number of inches of ticker tape issuing from the ubiquitous ticker.

The invention consists of a means to translate incoming time spaced coded signals into the simultaneous transmission of a plurality of signals for selectively operating the elements of a display device to synthesize a character having a definite and predetermined information quotient whereby the information being transmitted over a ticker service line, or any other like medium, will be displayed and locked into display until erased. The period of display will depend on the number of such display units provided and the density or speed of the transmission. Means are provided, operative upon the setting of one of such display devices, to release the earliest still operated display device a given number of units in advance thereof so that the record established previously will be erased at the same rate as the last transmitted information is recorded for display.

A feature of the invention is the use of a plural wire multiple as a link between the means responsive to the incoming signals each in the form of a plurality of code elements transmitted in seriatim and the readout device consisting of a plurality of linear display areas operated simultaneously by signals placed on selected wires of a plural wire multiple. In one form of the invention where, in particular, mechanical means are used to respond to the incoming code signals, the translation to the plural wire signals for operating the display devices may be direct whereas in another form where electronic means are used to respond to the incoming signals a double translation may be used, first a translation to an effect produced by the said mechanical means and thereafter a further translation to the plural wire multiple used for operating the said readout devices. Thus, in one case a plural wire multiple leading to the various display areas of the readout devices is employed, whereas in the other case an additional plural wire multiple is employed to interconnect a combination of two translating means. Either of said plural wire multiples may be used to transmit the incoming information to distant points, such as from a central office to various subscriber premises.

In one case the plural wire multiple having the smaller number of wires has certain economic advantages which, however, are modified by the cost of the additional translating matrix so that the choice between one and the other is an engineering consideration.

A feature of the invention is the combination of a plurality of display devices multipled to a plural wire multiple having one wire for each of a plurality of display producing means operated from a receiver of time spaced coded signals located in a central station, translated thereat into data manifestations and transmitted over a data transmission channel to a distant point where the said data manifestations are translated again to signals suitable for further transmission over said plural wire multiple.

A feature of the invention is a means for translating information embodied in codes each represented by a given number of binary code bits transmitted in seriatim into the display of characters each having a different information quotient and each expressed by the selective simultaneous display of linear display areas of a matrix having another given number of elements, the said translation being made in two steps, first a translation of said binary code bits transmitted in seriatim into an equal number of binary code bits transmitted simultaneously over the wires of a plural wire multiple, said plural wire multiple having one wire for each binary bit code place, and second a translation of said simultaneously transmitted binary code bits over said plural wire multiple into a group of binary bits transmitted over a plural wire multiple having a wire for each of said given number of elements in said display unit. In accordance with this feature where the means for receiving the said serially transmitted codes is to be separated in space from the said display means, either one or the other of the said plural wire multiples may be used as the connecting link. By way of example, where the information is originally transmitted by six place start stop telegraph code, the first of said plural wire multiples will have six wires to simultaneously carry the bits originally transmitted in seriatim. This six wire multiple then feeds into another translator where the information is then translated into the number of bits needed to operate the display device, herein shown as fifteen linear display areas so that a second plural wire multiple having fifteen wires leading to a plurality of readout devices is employed.

The invention may be stated as the combination of (1) A means responsive to coded signals in which the elements of the code are transmitted in seriatim and when received are then translated into equivalent coded signals in which the elements of the codes are placed simultaneously each on a different wire of a plural wire multiple, which said plural wire multiple extends to one or more locations where readout means are operated to display the information carried by said incoming signals, (2) Encoding means for translating said time spaced code elements into elements of an equivalent code for transmission over the wires of a plural wire multiple, (3) Diode means in said encoding means for obviating sneak circuits within the matrix consisting of said encoding means, (4) A plurality of readout means connected in multiple and accessible over said plural wire multiple, (5) A diode means in each incoming connection to said readout means for obviating sneak circuits within the matrix consisting of said readout means circuits, (6) A sequence means for selectively activating each said readout means in turn, and (7) Means for synchronously operating said sequence means under control of said first code responsive selector.

It will be noted that item 6 above, a sequence means, includes both a means for activating each readout means in turn and a means for deactivating or restoring such means a given number of readouts in advance of that one being set, so that in the display it will always appear that a given number of readout units in advance of the record being established will be blank.

A feature of the invention is a plural wire multiple having therein a number of wires equal to the number of display elements in a readout device and which are multipled to a plurality of readout devices and each of which serves as the termination of a plurality of matrix circuits from a plurality of signal contacts. By way of example, the letters C, E, F, G, H, K, L, M, N, O, P, Q, R, U, W and the numbers 6, 8 and 0 as well as certain other symbols having an information quotient will have a full length vertical line at the left hand edge thereof and hence each of these will place a signal from its single time spaced code responsive contact to the same wires in the said plural wire multiple to operate the same elements in that one of the multiple connected readouts which is put in a condition to respond. Further, by way of example, each readout has a total of fifteen display lines which may be used in different combinations to synthesize a symbol having any given information quotient but this number is in no manner to be understood as a limitation since, within the spirit of this invention, any other number of such line elements may be used to synthesize more elegantly formed symbols. However, in any given system constructed in accordance with the present invention, the said plural wire multiple will include a definite and invariable number of wires whereas there may be an indefinite number of single time spaced code responsive contacts leading into said multiple and an indefinite number of readouts multipled thereto.

By virtue of the above described arrangement, the said plural wire multiple may be terminated in a set of sensitive master relays each of which will then control a corresponding outgoing wire so that this said plural wire multiple may extend to any distance to operate distantly located banks of readout devices.

Another feature of the invention is the use of a plurality of stations, into which the said plural wire multiple extends, at each of which a plurality of readout devices are effectively multipled thereto. Under this arrangement, each wire of said multiple terminates at each said station in a sensitive relay so that a single master station at a central point may be employed to translate the time spaced incoming codes to the plural wire multiple signals which may then be distributed to a large number of subscribers' stations. Thus, the present invention may be embodied in one form wherein the single bank of readout devices is operated from a local device operated directly from a ticker transmission line or, alternatively, in another form in which a common means responsive to a ticker transmission line is used to distribute information to a large plurality of stations over a plural wire multiple.

Another feature of the invention is the use of a sequence means whereby each of a plurality of readout devices all connected in multiple to a said plural wire multiple is activated in turn and while all the said readout devices are permanently connected to said plural wire multiple, only that one which is activated will operate. Thus, the operating means of the present invention consists of a matrix of paths selectively activated at one end by time spaced code operated contacts, connected by means of a plural wire multiple to another matrix consisting of a plurality of display device circuits sequentially activated. When both ends of the circuit extending from a selectively operated single signal contact through these matrices and this plural wire multiple to a specific sequentially activated point are simultaneously connected in an effective electrical circuit, the said sequentially selected readout device will operate to display the character transmitted by time spaced code to the device. Thus the extensive circuit consisting of two matrices connected by a plural wire multiple is normally entirely inert having neither pole of a source of current connected thereto at any point.

Another feature of the invention is a means for automatically restoring the said readout devices to blank display. Since the said readout devices are effectively arranged in a ring in which they are sequentially approached and operated, this automatic release means is arranged to operate a given number of steps in the ring ahead of the device being activated for operation by the said sequence means. Thus the bank of readout devices will always display a given amount of information and for each new character being posted the oldest character being displayed will be erased.

Another feature of the invention is the inclusion in the plural wire multiple of a control circuit whereby the sequence means at the distant end of the circuit, particularly where this distant end is separated from the incoming end by a significant distance, such as that between a central office and a subscriber's office, may be operated properly in step with the incoming time spaced codes. Since the operation of a display device is brought about through the simultaneous application of battery to one end of a circuit and the application of ground to the other end and distant end thereof, it is essential that these two separated applications of the poles of the battery supply be made very strictly simultaneous. Therefore, the operation of the device at the one end of the circuit which responds to the incoming time spaced code is reflected as a control to the other end where it is employed to step the said sequence means.

Another feature of the invention, employed in the erasure of the oldest recorded display when the latest record is being established, is a circuit arrangement which will insure no interference between the two. The circuits of the readout device consist of two coils, one for operating and latching in a display element and the other for unlatching and restoring such an element and both coils terminate in a common conductor leading in to the sequence circuit. It is therefore esential that the ground connection applied to such common conductor for the readout being set be displaced in time from the ground connection applied to the different readout being restored. Specifically this is accomplished by controlling one from the front contact of a stepping relay and the other from the back contact thereof. Since both the readouts being operated are multipled to the same wires of the plural wire multiple, this separation of the application of ground to the common wire of the readout operation coils and restoring coils must be strictly observed. Put in another way, the application of ground to the common wire terminal for restoration must be displaced in time from the application of the other pole of the battery supply at the incoming end of the circuit, and this involves the above stated control wire included in the plural wire multiple. Therefore, this feature may be stated as the use of a control wire from the incoming end of the overall circuit to control a transfer contact means at the distant end thereof to separate in time the application of a ground to the common wire of the readout devices for the diverse operations of operating one device and restoring another device both of which are connected with their operating coils in multiple.

Another feature of the invention is a means to automatically operate the sequencing means in such manner that a space will be provided in the display between upper and lower case characters except where the transition between upper and lower case or between lower and upper case occurs between the last character to be displayed in one line and the first character in the next line. The sequencing means of the present invention is a means to activate each readout device in turn and hence to render the display clear and understandable the present means is provided to introduce a space between the letters and the figures or between the figures and the letters. In the conventional ticker tape this differentiation is provided by printing the letters on one level and the figures on another level and hence the space is not necessary and is never used, but where these different characters are to be displayed all in a continuous line, then the characters of these different categories must be set apart. Accordingly, a signal is sent over one of the control conductors included in the pural wire multiple to signal the distant end that the character being transmitted belongs in one or the other categories, either upper case or lower case, and means is provided at the distant end (where the display is being produced) to respond to a change from one category to another to automatically advance the sequencing means so that a space will be incorporated in the display.

Since the readout devices are mounted in a bank of a given number in each of a plurality of horizontal rows, it is not necessary that such a space be provided between the different categories when the last character of one category happens to be the last character of one row and hence means is provided to disable the said automatic means for introducing a space in the display. Therefore, a feature of this invention is a means to skip over a readout device, to leave a space in the display, whenever the next character to be displayed is in another category excepting when such next character is the first in another row.

In accordance with this feature, the sequencing means consists of a stepping switch to shift the application thereof from row to row and an open chain counter to shift the application thereof step by step along the readout devices comprising each row. The sequencing means is controlled by a relay operated from the incoming end of the circuit once for each incoming coded character. There is also a relay, likewise operated from the incoming end of the circuit which is operated when the incoming character is in one category (figures) and which is left unoperated when the incoming character is in another category (letters). There is then a circuit arrangement between said two relays by which a momentary operation of the first is caused by either the operation or the release of the second and since each and every operation of the first advances the point at which the sequencing means becomes applied, a readout device will be skipped upon each operation or release of the said second relay excepting where the said open chain counter is set at the last stage. At such last stage where the restoring means of such counter is operated, the circuit arrangement between the said second and said first relays is interrupted by the stepping means of the step by step switch for advancing the sequencing means from row to row and hence no readout device is skipped when the normal advance is from the last device in one row to the first device in the next row.

In accordance with another feature of the invention, the readout devices, instead of being arranged in a bank in rows and tiers, may be placed in a double row in which the information is longitudinally displayed, the devices of the upper row being operated to display lower case characters while the devices of the lower row are operated to display upper case characters thus simulating the appearance of the ubiquitous ticker tape. In this arrangement no blanks are needed between lower and upper case characters as the different levels of the display point up this change in category. However, a means is provided to produce blanks in this same manner when the end of this double row is reached and a change in category occurs within a given number of readout devices from such end, for avoiding confusion which would result from splitting a display into two distantly located parts.

In this longitudinal two level display arrangement, a category relay is necessary so that two control wires are needed in the plural wire multiple, one to carry the count of the incoming code signals (operated by the universal contact or its equivalent) and the other to carry the change in category (operated by the shift contact or its equivalent). This two level display besides presenting a more conventionally realistic display has certain commercial advantages among which the use of a simpler readout device for the upper case characters may be noted.

The drawings consist of eleven sheets having nineteen figures, as follows:

FIG. 1 is a general schematic circuit drawing showing how the device of the present invention may be employed to display in widely separated locations the information disseminated by wire service, such as the widely used ticker service circuits;

FIG. 2 is a schematic circuit drawing showing the device connected to the ticker service circuit and indicating how it may be constructed and arranged as a single self contained device or, alternatively, how it may be arranged as a master and centrally located device to respond to and translate the incoming ticker service codes used to feed into a plurality of scattered and distantly located display devices;

FIG. 3 is an enlarged short portion of a ticker service punched transmitting tape used to indicate how a single contact maker of what is known as an editing ticker may respond to two different incoming codes, the difference in such codes residing in the presence or absence of a category indicating signal punched hole which being absent will indicate a "letter" character and being present will indicate a "figures" character and will accordingly cause the non-operation or the operation of a shift contact or a category indicator;

FIG. 4 is a set of graphs indicating the time relationship between the elements of the incoming codes and the responsive operation of the contact makers, the category indicator and the universal contact or incoming code counter;

FIG. 5 is a representation of a section of punched tape used in a centrally located transmitter for distributing information conventionally to tickers and to devices such as those of the present invention;

FIG. 6 is a representation of a portion of ticker tape that would be produced by the punched tape of FIG. 4;

FIG. 7 is a representation of an exemplary group of readout devices operated by the tape of FIG. 4 used herein to explain the operation of the circuits and devices of the present invention;

Figure 1:
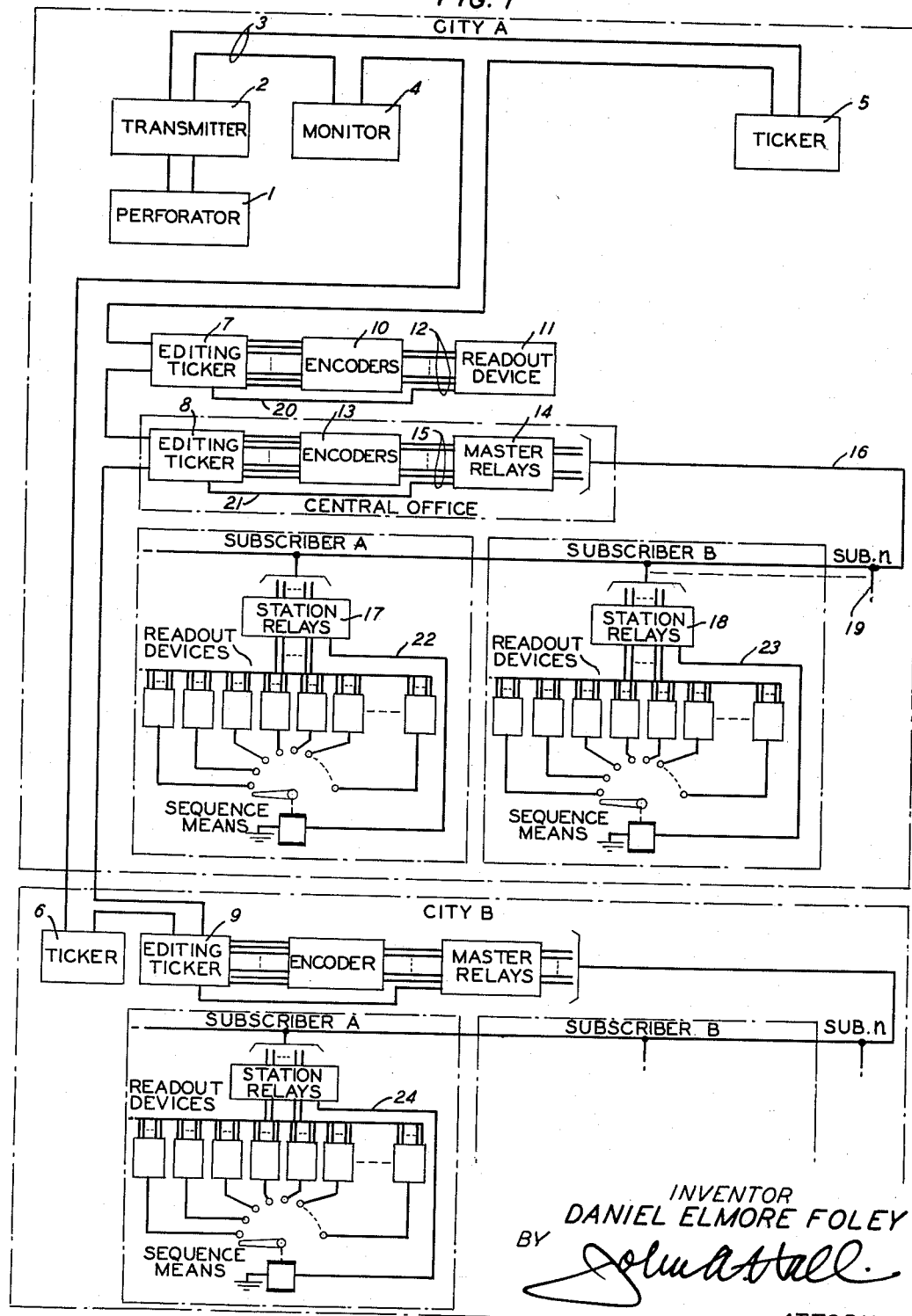
Figure 9:
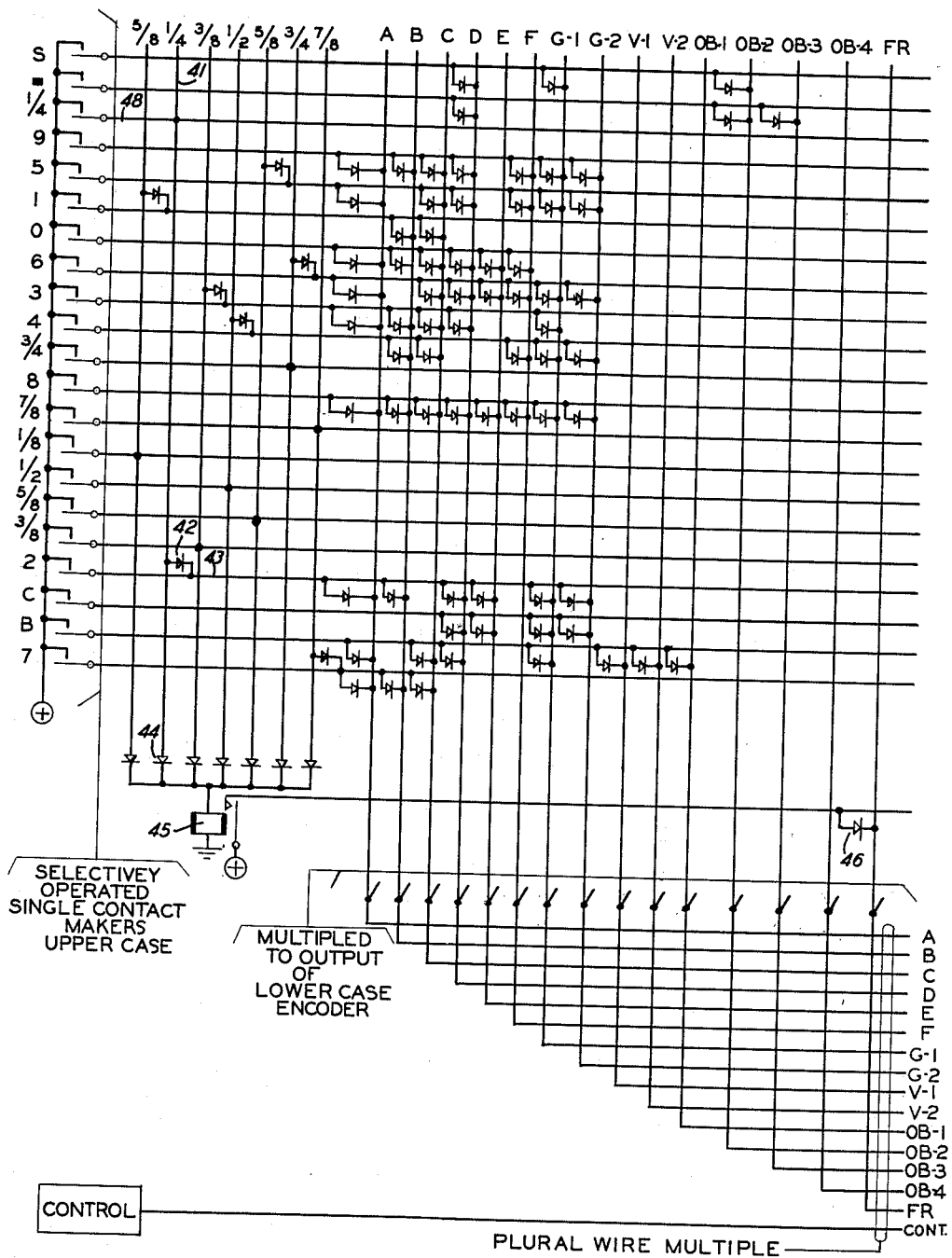
FIG. 9 is a schematic circuit diagram showing the details of the numeric (upper case) encoder whereby the incoming signals on the ticker wire are translated to coded signals on the plural wire multiple.
Figure 10:
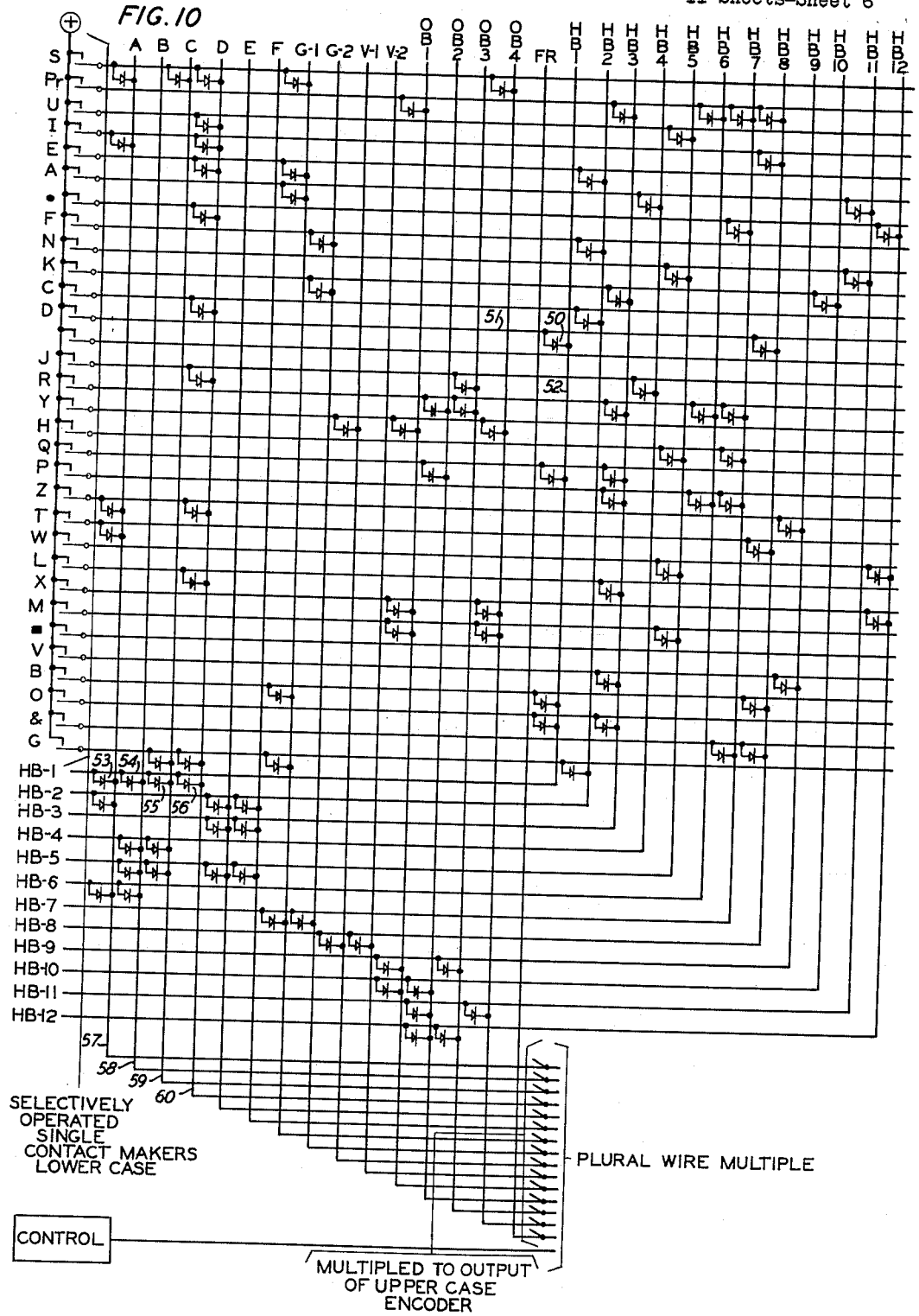
FIG. 10 is a schematic circuit diagram showing the details of the alphabetic (lower case) encoder whereby the incoming signals on the ticker wire are translated to coded signals on the plural wire multiple.
Figure 18:
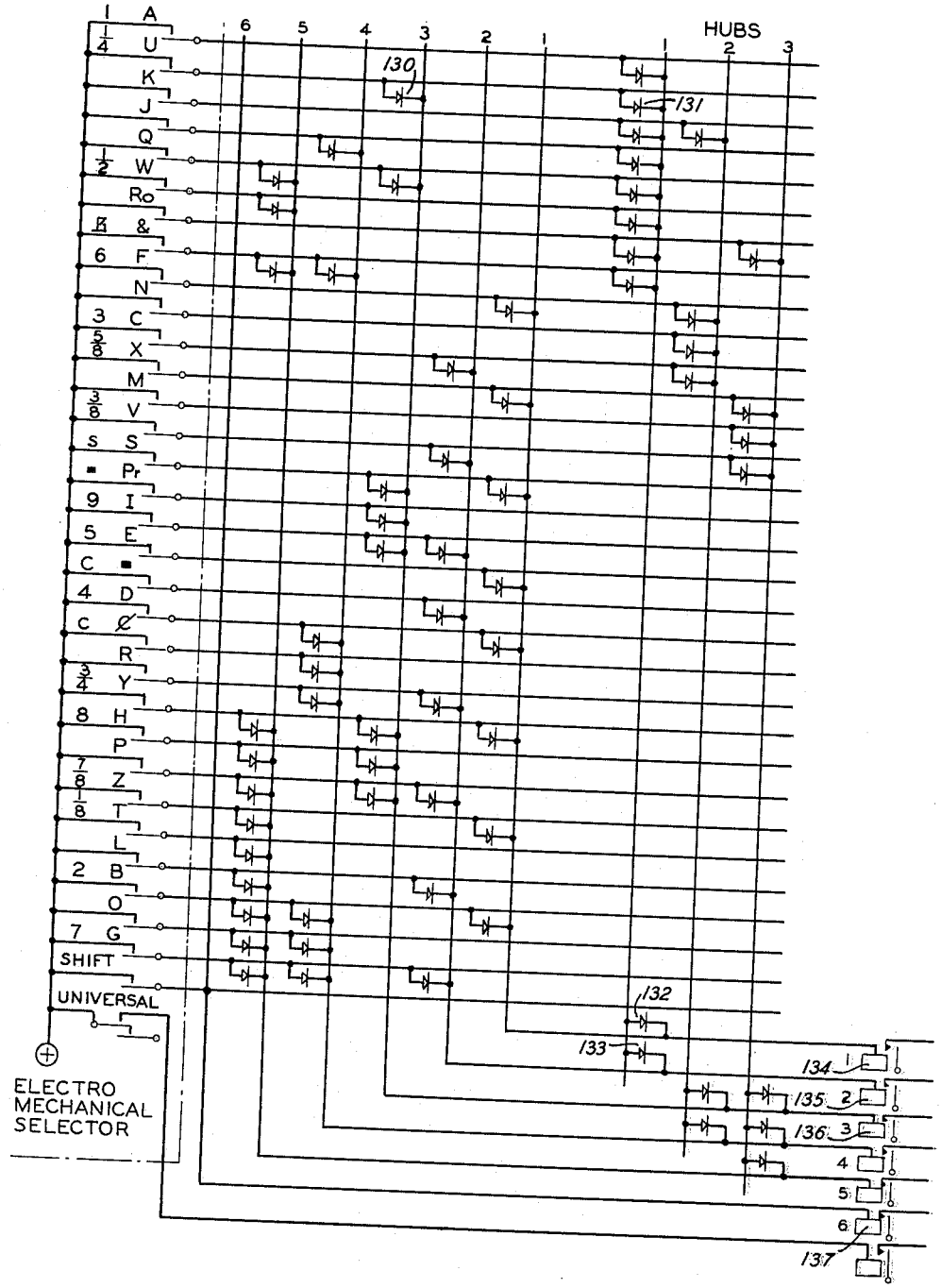
Figure 19:
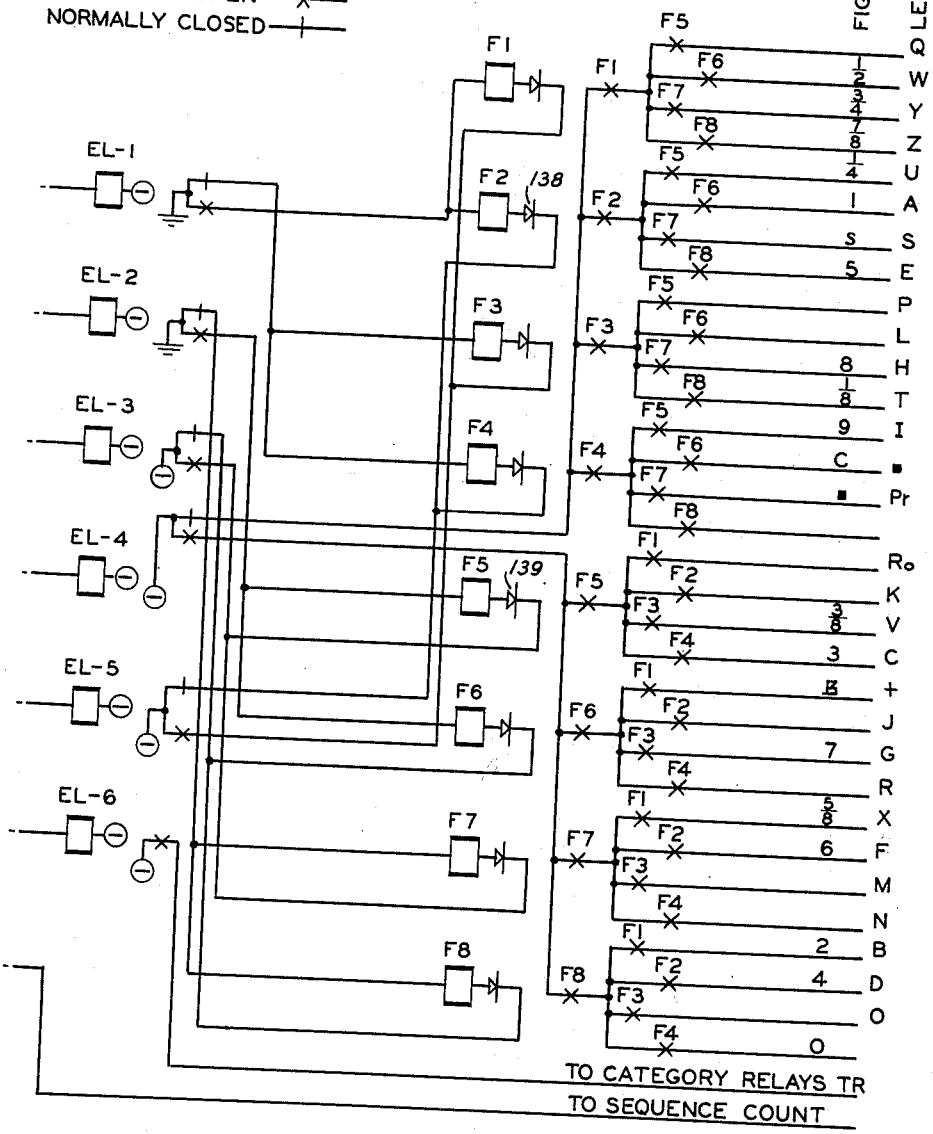

FIG. 13 is a schematic of one form of the present system in which an electromechanical selector, otherwise herein denominated an editing ticker, and a translator to translate some fifty character outputs into seventeen signal manifestations applied to the seventeen wires of a plural wire multiple for operation of the multipled readout devices and in which the said plural wire multiple may be used for extending the output of the diode translators located at a central point to a multipled plurality of readout devices as indicated in FIG. 1;

FIG. 14 is another form of the invention in which the link of FIG. 13 between the diode translators and the said multipled readout devices includes a means to code the said seventeen wire plural wire multiple signals for transmission over a data transmission channel and to decode the signals thus transmitted into signals appropriate for the seventeen wire plural wire multiple leading to the multipled readout devices;

FIG. 15 is another form of the invention in which the output of the selector and the extensions of the contact maker circuits expanded in the shift relay circuits to some fifty outputs is translated into a set of signals which may be transmitted over a seven wire multiple which at a distant point may be expanded in a fan circuit to expressions for some fifty characters and thereafter translated to signals appropriate for the seventeen wire plural wire multiple leading to the multipled readout devices;

FIG. 16 is another form of the invention in which an electronic selector may be used to translate the incoming ticker service signals directly to signals appropriate for transmission over the seven wire plural wire multiple to a similar distant circuit arrangement including a fan circuit and the seventeen wire plural wire multiple leading to the multipled readout devices;

FIG. 17 is another form of the invention in which the coder, channel and decoder of the data transmission means may be introduced in the small plural wire multiple of FIG. 16 wherein the said data transmission channel serving a seven wire arrangement may be simpler and more economical than that shown in FIG. 14 serving a seventeen wire arrangement;

FIG. 18 is a schematic circuit drawing showing details of the diode translator of FIG. 15 by which the set of mechanical contact makers selectively activated by the editing ticker may be operated to transmit the information over a small plural wire multiple containing five wires for the code elements, a sixth wire for category indication, and a seventh wire for signal unit counting by which the sequence of the distant display units is advanced, and FIG. 19 is a specific form of the conventional fan circuit by which the six wires of the small plural wire multiple, such as that coming from FIG. 18 or the equivalent coming directly from an electronic selector, may be translated into some fifty output circuits by which the different units of information may be represented and forwarded to the diode figures and letters encoders of FIGS. 9 and 10.

The system in which the present invention is used is indicated in FIG. 1. There is, at some given location, let us say in City A, the apparatus for transmitting information which may include a perforator 1 for preparing a tape and a transmitter 2 for transmitting the information embodied therein over a line 3 extending through monitoring means 4 to conventional tickers, such as 5 and 6, and to means herein shown as editing tickers 7, 8 and 9. The editing ticker 7 is a type of conventional telegraph selector, such as a so-called ticker which has been modified by the removal of its type wheel and the provision of a contact maker operated by each of its stop-pins. Such a device is shown in a large number of patents among which the Dirkes et al. Patent 1,951,570, issued March 20, 1934, and the Dirkes et al. Patent 2,023,952, issued December 10, 1935, may be noted. It is intended that the devices 7, 8 and 9 represent any conventional type of apparatus consisting of a plurality of single contact makers which will respond to signals transmitted over the service wires 3, generally of a plurality of categories, such, by way of example, as upper case and lower case information. As it will appear hereinafter, the lower case letter U and the upper case character ¼ will both operate the same contact maker and these two will be differentiated by the operation of a set of shift contacts hereinafter designated the category indicator.

Such editing tickers may be located in different cities or in different central offices in any one city or even in different customer locations.

The invention may be embodied in a single and compact device where the contact makers of the editing ticker work through a set of encoders 10 directly into a readout device 11 wherein the plural wire multiple 12 is short and is individual to the plurality of readout devices here designated 11. Alternatively, the set of contact makers embodied in the editing ticker 8 may be placed in a central office with the encoders 13 and a set of master relays, one terminating each wire of the plural wire multiple 15 and feeding a corresponding wire of the plural wire multiple 16 which extends to several subscribers' premises. Thus the different groups of readout devices 17, 18 and 19 may be fairly close together, as in the same office building, or they may be scattered. Since the plural wire multiple entering each different subscriber's premises starts with a set of station relays responsive to the master relays at the central office, the distance between the various subscribers' devices is not a factor. Where all the subscribers' readout devices are closely grouped and the number thereof is not great, the station relays may be eliminated and the readout devices may be worked directly from the wires of the plural wire multiple 16. The use of the station relays 17 and so on is an engineering problem which may be handled by any worker in this field.

Finally, each editing ticker is provided with what is known as a universal contact, one which is closed once for each incoming code and which may be termed an incoming signal counter. This universal contact may be connected to the sequence means used for successively activating the individual readout devices. It is indicated as wire 20 from the editing ticker 7 to the readout devices 11 and as wire 21 from the editing ticker 8 to the master relays 14 and thus becomes one of the wires in the plural wire multiple, such as 12 or 15, and this carries the count of the incoming signals over a wire, such as 22, 23 or 24, to the various sequence means. It will be noted hereinafter that as the so-called universal contact of the editing ticker is closed and places one pole of battery on a contact maker that the distant sequence means is operated and places the other pole of battery on the readout device which has thus been successively activated.

FIG. 2 is another schematic showing particularly the relation between the contact makers selectively closed by the editing ticker, or any other means, and the particular distinct terminal circuit closed by the sequence means, this schematic being intended to show in series the contact maker, the category indicator, the encoder, the wires of the plural wire multiple, the readout device and the sequence means which selects in sequence the particular readout device to be activated. The contact maker 26, selectively operated by the ticker relay 25, extends to the armature of the shift relay 27, which thereby shifts from the normal lower case (letters) to the upper case (figures). If relay 27 remains unoperated, then the circuit will extend through the one way circuits of the letters encoder 28 to the wires of the plural wire muliple 29 which are multipled at their incoming ends to the various encoders and at their distant outgoing ends to the operating coils of a large number of readout devices, such as 30 and 31. An operating wire from each readout device leads to a sequence means whereby the various readout devices may be successively activated.

It may be noted that at the incoming end of the circuit a shift contact and a universal contact are provided. These are conventional and hence are shown here merely as contacts 32 and 33. The universal contact 33 is operated once for each incoming signal and hence may be termed a signal counter and this being extended over wire 34 in the plural wire multiple to the sequence means relay 40 will advance the sequence means one step for each incoming code. The shift contact 32 is closed only when the incoming code is for upper case (figures) and hence may be termed a category indicator for when the incoming code is lower case (letters) it leaves relay 27 unoperated, but when the incoming code is upper case (figures) it causes relay 27 to be operated.

A relay 35 in parallel with relay 27 should be noted. This relay upon operating will cause the transient operation, through the charging of a condenser 36, of relay 37 and upon releasing will in like manner cause the transient operation, through the charging of a condenser 38, of relay 39. Relays 37 and 39 will cause a transient operation of the distant sequence means relay 40, whereby the sequence of the operation of the readout devices is advanced without an operation thereof, in other words, each time the shift contact is closed or each time it is opened, the sequence is advanced and a readout device is skipped to leave a blank in the display. It may be noted that the transient operation of the sequence means not only causes the skipping of a blank readout but also causes an operated readout one line in advance to be restored.

FIG. 3 is a short but much enlarged piece of punched tape having a lower case code for U punched therein followed by an upper case code for ¼ also punched therein. It will be noted that these codes are the same except that the first has no hole for the sixth contact whereas the second has such a hole. This sixth place hole is a category indicator and will have the effect indicated in the first graph of FIG. 4 where no marking pulse is present in the sixth place of the code for U whereas there is a marking pulse present in the sixth place of the code for ¼. It may be noted in passing that in the readout devices of the present invention fractions such as ¼ are translated to the numerators of equivalent eighths. Thus the contact for U in lower case is the same as for ¼ in upper case or for 2 in the upper case of the present arrangement.

FIG. 4 is a set of graphs inserted herein to explain the operation of the universal contact of the editing ticker, or, as it is called herein, the incoming signal code counter and the operation of the shift contact of the editing ticker or, as it is called herein, the category indicator. It will be noted that the signal counter operates regularly in the cycle of each incoming code from about the middle of the third mark or space pulse and remains operated until about the middle of the following stop pulse. The category counter (the shift contact) when operated, becomes operated at the beginning of the next incoming code cycle but the closure of the contact maker is delayed until the following closure of the universal contact. Hence there is time within the periods for the start, first, second and part of the third code elements for the operation or the release of the category indicator to become effective to skip a readout device for the purpose of leaving a blank in the display.

Further specific details of the shift contacts and the universal contacts, as they are known in conventional devices, may be found in the Dirkes et al. patents hereinbefore set forth.

FIG. 5 shows a representation of a ticker transmitting tape which may be prepared on the perforator of FIG. 1, and FIG. 6 shows a representation of a conventional ticker tape which will be issued by any of the conventional tickers indicated in FIG. 1 or, alternatively, which may be produced by a comparatively long string of readout devices arranged in two rows, the upper displaying the lower case characters (alphabetic) and the lower displaying the upper case characters (numeric) to produce a display having the appearance of a ticker tape.

FIG. 7 is a representation of a limited number (for the purpose of explaining the operation) of readout devices placed in rows and columns and which embodies certain novel features of the invention residing in the means for automatically skipping a readout device when a change in category takes place since in this form of the display of information the different categories are not displayed in different levels as in the conventional ticker tape.

Each display device, such as those indicated by the thirty-five oblongs of FIG. 7, is an electromechanical device having fifteen apertures in the face thereof each in the form of a comparatively long and narrow slit with a movable display producing means behind it. In normal position such display producing means is of the same color as the face of the device but when operated is of a highly contrasting color. These display producing means may be operated in selected combinations so as to synthesize an information character such as a letter of the alphabet or one of the numerical digits.

Details of the construction and operation of the readout devices may be found in (1) Patent 2,836,773, issued May 27, 1958, to Alfred Skrobisch, (2) application of Alfred Skrobisch, Serial Number 800,353, filed March 18, 1959, and disclosing means for latching the electromechanical elements thereof, and (3) application of Alfred Skrobisch, Serial Number 36,984, filed June 17, 1960, disclosing a segmental readout device having a display producing means for each display area thereof.

Figure 8:
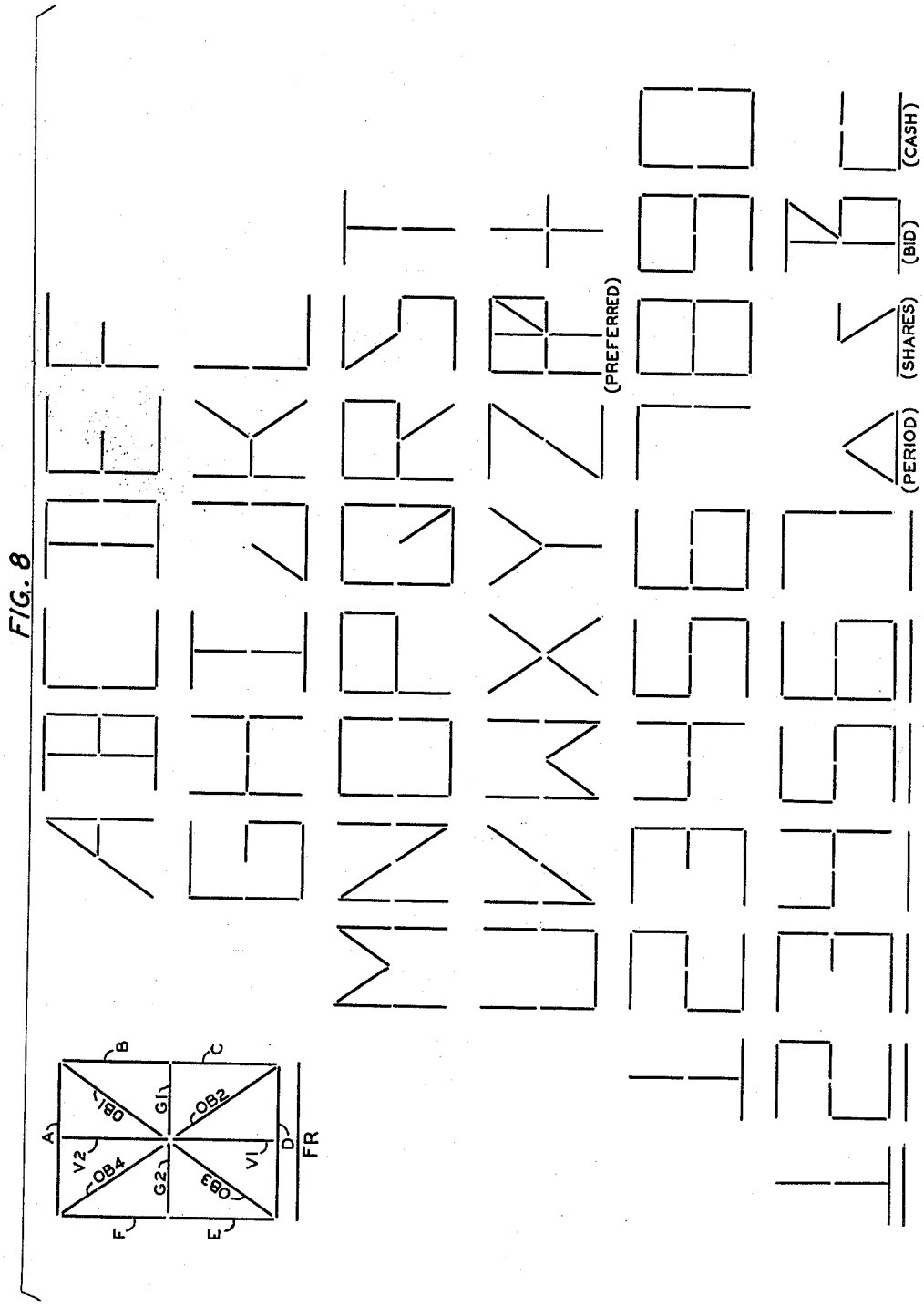
FIG. 8 is a showing of the face of a readout device indicating the fifteen areas in each of which a bar may be made to appear whereby the alphabetic and other synthetic characters also shown in this figure may be produced for display.

The face of the readout device and the various characters formed thereby are shown in FIG. 8. It will be understood that the face of the device in actual appearance will be substantially a blank, the various lettered bars being boldly delineated here for purposes of explanation. Also it is to be noted that the characters shown in this figure are synthesized from a minimum number of display areas and it will be understood that more elegant information characters could be formed with a greater number and variety of display areas. The present invention is not limited to the use of any particular number of display areas.

As indicated in FIG. 2, the contact makers and the wires of the plural wire multiple are interconnected by a plurality of one-way connections shown herein in FIG. 9 for the numeric encoder and in FIG. 10 for the alphabetic encoder.

Thus, in FIG. 9 a contact maker which may be closed by a code having mark pulses in the first, second and third places of the start stop code and a mark pulse in the sixth place will close and extend a positive battery potential to conductor 48 which is connected to a conductor 41. By means of a crystal diode 42 (1N91) this potential is conveyed to the wire 43 for the numeral 2, since 2 is the numerator of the fraction ⅖. Then by means of six more diodes connected to the A, B, D, F, G-1 and G-2 bars of the readout device, the figure 2 is synthesized. By means of a diode 44 a connection is also extended to a relay 45 which in turn, through a diode 46, additionally places this positive potential on the wire Fr (fraction) in the plural wire multiple. It may be noted that when a contact maker activates the wire 43 (for the numeral 2) that only the bars A, B, D, E, G-1 and G-2 are activated, but when, as above described, the wire 48 (for the fraction ¼) is activated that then the bar Fr in addition is operated. By means of these diode connections all sneak circuits to other bars and conductors are avoided. Thus the operation of a particular contact maker will synthesize a particular and corresponding information character. It therefore appears that the contact makers and the wires of the plural wire multiple are interconnected by paths by which current will flow (conventionally) only in the direction from the contact maker to the selected wires of the plural wire multiple.

In like manner, FIG. 10 shows the matrix of one-way paths between the wires coming from the selectively operated contact makers and the wires of the plural wire multiple leading to the multipled operating coils of the readout devices. This is known as the lower case or letters encoder and will operate in the same manner as the circuits of FIG. 9.

It may be noted, by way of example, that certain combinations of bars are used in a plurality of alphabetic characters, such as the bars A, B, C and D which are used in the letters D, Q, B and O. Under ordinary arrangements this would require sixteen diodes but by using a single diode such as 50 to interconnect the wire 51 from the contact maker for the letter D to the hub conductor 52 from which four diodes 53, 54, 55 and 56 make connection to the wires 57, 58, 59 and 60 of the plural wire multiple leading to the display producing coils A, B, C and D respectively of the multipled readout devices, eight diodes may be saved. It is believed that the arrangement of the one-way connections between the contact makers and the wires of the plural wire multiple will be clear as shown in FIG. 10.

Figure 11:
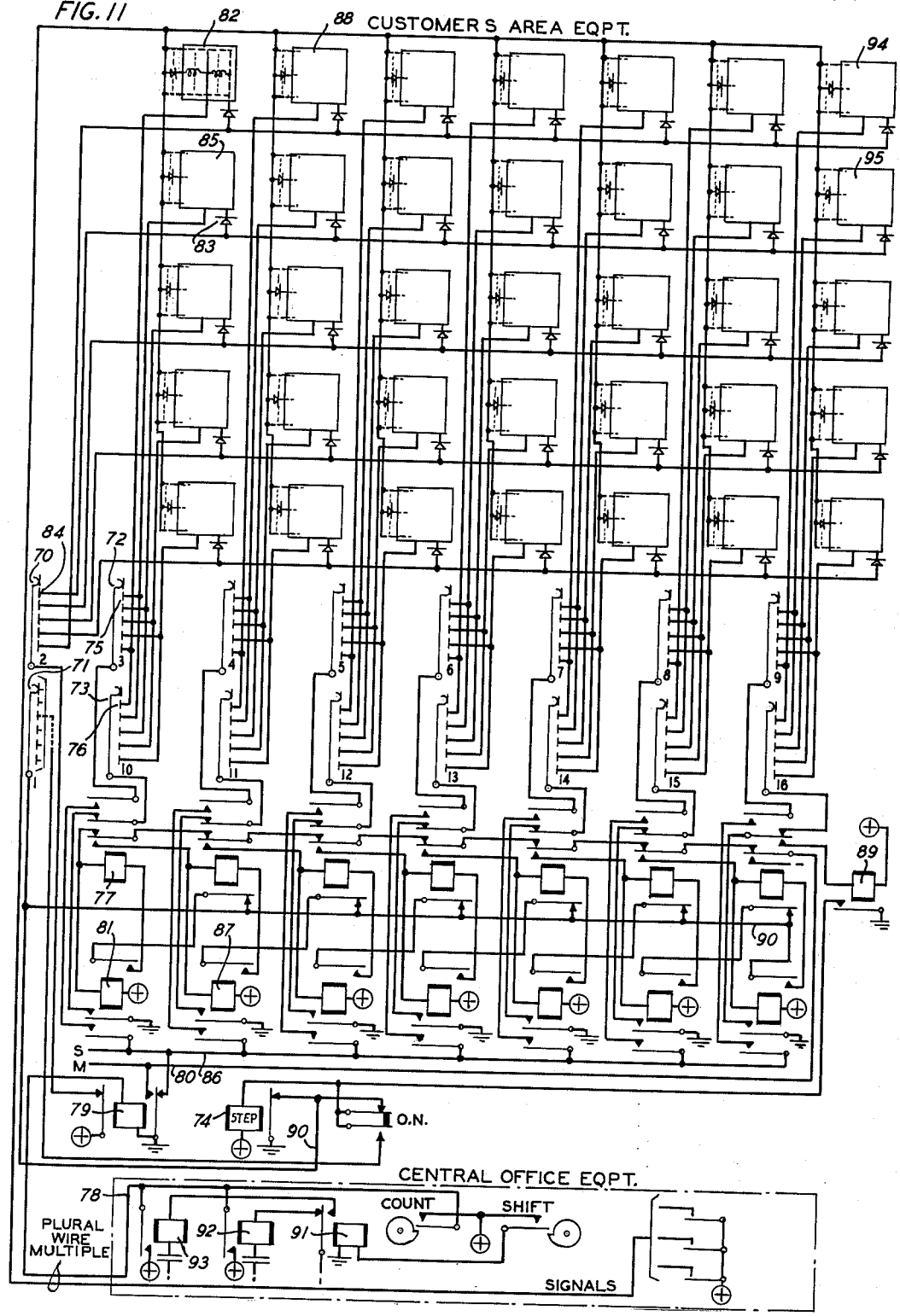
FIG. 11 is a schematic circuit diagram showing the sequence means whereby the readout devices are successively selected for activation where such readout devices are mounted in a bank consisting of a plurality of rows and in which both the alphabetic and numeric characters are displayed in the same line.

It has been set forth hereinbefore that a feature of the invention is the use of a plurality of readout devices all connected in parallel to the wires of the plural wire multiple and selectively activated by a sequence means. Details of this sequence means in one form of the invention are shown in FIG. 11. Each readout device is provided with fifteen display areas and each such display area is controlled by a display producing means, herein shown as a coil, one end of which is connected to a wire of the plural wire multiple and the other end of which is connected to a common wire leading into the sequence means. When a readout device is to be operated a battery connection is made to selected wires of the plural wire multiple from an operated contact maker through the encoder matrix and simultaneously therewith a ground connection is made to the above set forth common wire in the sequence circuit whereby certain selected areas of said readout device are made to display bars or lines to synthesize an information character. Such display is locked into operation and will maintain the established display until the device is restored by the simultaneous energization of the fifteen restoring coils, one for each of the display areas provided.

In one embodiment of the invention and as indicated in FIG. 7, there are five horizontal rows of readout devices each having seven devices therein. The sequence means consists generally of a set of seven pairs of counting relays to count off the devices in a row and a stepping switch to apply the said counting relays to each level in turn whereby the thirty-five devices may be activated in sequence.

By way of example, let it be assumed that all the brushes 70, 71, 72, 73 and so forth, all of which are stepped simultaneously by the stepping magnet 74 are momentarily on their first or normal contacts and that the conventional ON (off normal) contacts are not operated. A circuit from ground on an armature of the stepping magnet 74 will therefore be closed through the ON contacts to the winding of the stepping magnet and the brushes will be moved to the first set of contacts which are effectively in use. It may be noted here that each level reached by the brush 71 which is not in use will be connected through a lower contact of the ON switch to the winding of the stepping magnet 74 so that the switch will be always automatically moved to an equipped level.

Now let us assume that all the brushes of the switch have been moved to their first effective contacts (the second ones such as contacts 75 and 76) so that the circuit connected to contact 75 will now be connected through brush 72 to the uppermost armature of relay 77 and the circuit connected to contact 76 will be connected through brush 73 to the middle upper armature of relay 77. It will thus be seen that when a counting pulse (from the universal contact of the editing ticker) is transmitted over the wire 78 (in the plural wire multiple), the relay 79 will be operated and ground will be connected to the mark wire 80, thence through the chain circuit of the counting relays to the counting relay 81. Relay 81 will operate but relay 77 will be shortcircuited until the ground is removed from the mark conductor 80. Therefore, during the operation of relay 79 a ground will be extended from the inner lower armature of relay 81 and the back contact of the middle upper armature of relay 77, the brush 73, contact 76, to the common operating coil conductor of the readout device 82 whereby this readout device will be operated to synthesize a character simultaneously put on the wires of the plural wire multiple.

In the showing in FIG. 11 in the lower right hand corner there is an indication of a set of contact makers feeding into a wire marked "signals" which represents the fifteen wires of the plural wire multiple each of which wires is connected through a diode to one of the display producing coils of each of the readouts as indicated in the upper left hand readout 82. Thus the connections from this plural wire multiple to each of the readouts is to be understood as being made through a separate diode for each of the fifteen wires leading to each of the fifteen coils which are connected in multiple to the wire leading to the switch terminal 76.

Upon the release of relay 79, the ground from the back contact of the stepping magnet 74 which supplied the ground for keeping relay 77 from operation will become effective and relay 77 will now operate in series with the relay 81. As relay 79 returns to normal, battery will now be connected through the left hand back contact and armature thereof, brush 70, its contact 84, the diode 83 to the restoring coils of the readout device 85, the common conductor thereof, the contact 75, the brush 72, the uppermost armature and contact of relay 77, the front contact and lower armature of relay 81, the space wire 86, the back contact and right hand armature of the relay 79, to ground. Therefore, the readout device 85, one row in advance of the readout device 82 just operated will be restored. Upon the following operation of the relay 79, this restoring circuit will be opened and the operation of the next counting relay 87 will cause the operation of the next readout device 88.

It is therefore clear that as the information comes in step by step to operate the contact makers of the editing ticker the readout devices 82, 88 and so on will be operated one by one and that one row in advance thereof the previously operated readout devices 85 and so on will be restored.

When the end of a row is reached and the readout device 94 has been operated, then upon the release of relay 79 the readout device 95 will be restored. Since relay 79, upon restoring, removes ground from conductor 80 and then connects such ground to conductor 86 to ground the restoring coils of readout 95, the upper relay of the last counting relay pair will operate and this will extend ground to the restoring relay 89. Relay 89, in operating, will cause the operation of the stepping magnet 74 and since this removes the ground from conductor 90 the counting relays will be restored. Relay 89 will then be released and the stepping magnet will in turn be released so that the switch will step its wipers to the next row.

However, if either of the relays 92 or 93 operates transiently during this released period of the relay 79, the holding ground on wire 90 will be absent so that even if the first counting relay 81 tends to operate transiently it cannot lock up before relay 79 restores and hence the first readout device 85 of the next row will not be skipped.

Figure 12:
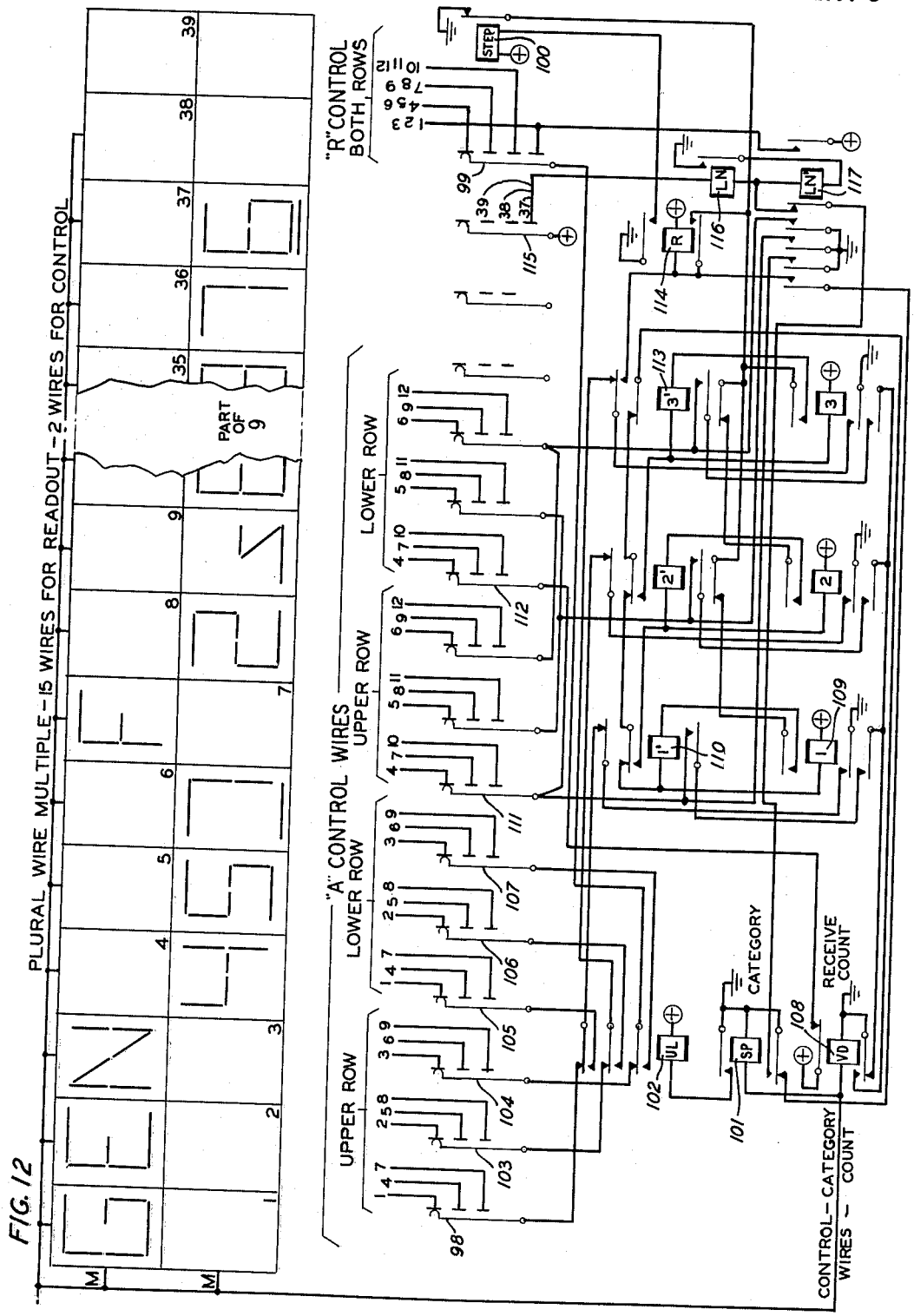
FIG. 12 is a schematic circuit diagram showing the sequence means whereby the readout devices are arranged in a double row for linear display simulating the conventional printed ticker tape.

In accordance with a certain feature of the invention, the plurality of readout devices are disposed in a long double line so that the appearance of the conventional ticker tape may be simulated with the lower case characters (letters) in the upper row and the upper case characters (figures) in the lower row. Such an arrangement is shown in FIG. 12 where each readout device is represented by a rectangle, all of which are represented to be connected in multiple to the plural wire multiple.

It may be noted from FIG. 2 that each readout device, such as the device 31, has an incoming channel marked M (for multiple) which is shown in places as a single line, but which represents fifteen conductors one for each operating coil thereof, a control wire A (for activate) which is grounded from the sequence circuit when the operating coils are to be energized and, alternatively, when the restoring coils are to be energized, and a wire R (for restore) which is connected to battery from the sequence circuit when the restoring coils are to be energized.

For the purposes of disclosing certain features of the invention appearing in this arrangement, it will be assumed that there are thirty-nine readout devices in both the upper and the lower rows. Each readout device is represented by a rectangle within some of which displays are shown and within others in the lower right hand corner numbers are drawn. Thus, in the left hand pair of readout devices, the number 1 is shown in the lower row device and the displayed letter G is depicted in the upper row device.

Directly below this double row of readout devices, a step-by-step switch is represented. This is a conventional device wherein sixteen brushes, such as the brushes 98 and 99, are stepped by the stepping magnet 100. Each brush steps over a bank of twenty-six contacts. The first three contacts reached by the brush 98 are connected to the activate or A terminals of the number 1, 4 and 7 readout devices in the upper row of readout devices. By this arrangement a chain of three counting relays is used to successively activate devices 1, 2 and 3 in the upper row or, alternatively, the devices 1, 2 and 3 in the lower row if the shift relays have been activated and the battery has been transmitted over the SP control wire in the plural wire multiple to the SP relay 101 to operate the category switching relay 102. Since the brush 98 traverses 13 contacts (two times), the three brushes 98, 103 and 104 will thus successively subject all 39 readout devices in the upper row to activation and the brushes 105, 106 and 107 will likewise subject all 39 readout devices in the lower row to activation. It will be noted that when the receiving or incoming signal counting relay 108 is operated that some one, such as 109, of the counting relays is operated so that ground is extended through the back contact of its companion relay 110 to an armature of the relay 102 for further transmission to either brush 98 or brush 105. When the relay 108 releases, the relay 110 becomes operated and a ground is now extended to brushes 111 and 112 which reach the A wires of number 4 readouts both in the upper and lower rows and at the same time battery is extended to the R wire of the same readout by way of the brush 99. Thus, a previously operated readout device three places in advance of that one just operated will be cleared.

Each time the relay 108 releases to cause the operation of the counting relay 113, the restore relay 114 will be operated and this will cause the stepping switch to move its brushes to the next contact by the operation of the stepping magnet 100. The complete operation of this switch, and the sequential operation of the readout devices, is believed to be obvious.

When the stepping switch brushes, including brush 115, reach their last contacts (the thirteenth or the twenty-sixth multipled thereto) wherein devices in places 37, 38 and 39 may be set, a battery connection for relay 116 is provided. If at this time the category relay 101 is operated, then a circuit will be provided for relay 116 but as long as relay 101 remains operated the companion relay 117 will be shortcircuited and will not operate. Let us say that readout 37 in the lower row (because the category relay 101 is operated) is now operated to display the underlined numeral 6 (meaning % or ¾). This will be followed by the letter G, so that the category relay releases. This allows the relay 117 to operate so that the restore relay 114 is immediately operated so that neither of the devices in places 38 and 39 may be operated. Also, relay 117 places ground on brushes such as 111 and 112 to ground all six of the A control wires of both the upper and lower devices in the 1, 2 and 3 places and the relay 117 places battery on the corresponding R control wires thereof, so that the first three sets of readout devices will be cleared.

The operation of the restore relay 114 causes the operation of the stepping magnet 100 so that all the switch brushes move to their first positions (as shown) and the letter G which was to have been recorded in the upper row readout device 38 will instead now be recorded in the first readout device (as indicated). The movement of the switch brushes to their first positions releases the relays 116 and 117 and the circuit is restored to normal. The use of the circuit including relays 116 and 117 avoids splitting a commodity identification (such as GEN) into two parts widely separated.

FIGURES 13 to 17 inclusive are schematic drawings to indicate various circuit arrangements by which the incoming signals transmitted over the ticker service channel may be translated into signals appropriate for transmission over the plural wire multiple to which a large number of readout devices are multipled and which may be sequentially operated to produce a display of current information regardless of whether the readout devices are closely associated with the ticker service selector or whether they are located at a distance therefrom. FIG. 13 shows the fundamental arrangement shown also in FIG. 1, where in one instance the editing ticker 7, a conventional form of an electromechanical selector, is closely associated with the readout means 11 and where in another instance the editing ticker 8 is located at a central office and a plurality of display means for subscribers A, B and n are indicated as being located at a distance and being served by a plural wire multiple 16 having some seventeen wires therein. If the arrangement of FIG. 11 is used, where the readout device is skipped and left blank when a change in category takes place, then sixteen wires will be sufficient, fifteen for the display areas of the readout devices and one more for the counting of the incoming signals. Where the skipping feature of FIG. 11 is not employed, as in FIG. 12 where the readout devices are arranged in a double row so that the display may be made to simulate the conventional ticker tape, then a second control wire must be included in the plural wire multiple to bring a category indication to the location of the said double row of readout devices.

FIG. 14 shows an arrangement which may prove to be more economical wherein a data transmission link is used within the length of the plural wire multiple. Thus, the coder 120, which is a parallel to serial signal converter, the data transmission channel 121 and the decoder 122, which is a serial to parallel signal converter, all of which are conventional, are inserted in the plural wire multiple having 16 or 17 wires. The problem here is economic and is one which must be solved with respect to the circumstances of each installation, it being primarily a question of the relative costs of a plural wire multiple having 16 or 17 conductors and the costs of the coder 120 and the decoder 121.

Another arrangement is shown in FIG. 15 wherein a small plural wire multiple is employed, one having seven wires instead of the sixteen or seventeen of the previous arrangements. Thus, a diode translator 123 is used which, in effect, translates the incoming six place time spaced codes into six place simultaneously transmitted codes accompanied with a count wire making a multiple of seven wires. At the far end of this small plural wire multiple a conventional fan circuit 124, shown in detail in FIG. 19, is used as an input to the diode translator 125 which feeds into the plural wire multiple used to operate the readout devices. It may be noted that a category wire may be derived from the fan circuit 124 since the sixth place of the start stop code into the selector and transmitted to the fan circuit 124 is in itself a category indication.

FIG. 16 is another arrangement which may be used wherein the electromechanical selector of FIGS. 13, 14 and 15 is replaced by a conventional electronic selector 126 which immediately translates the time spaced incoming codes into equivalent simultaneously transmitted six place codes exactly equal to the output of the diode translator 123. Since this electronic selector also derives a count of the incoming signals, a seven wire plural wire multiple may be used to feed into the apparatus at the distant end including the seventeen wire plural wire multiple used for operating the readout devices.

FIG. 17 shows another variation of the present invention in which the data transmission channel 127 is terminated by a seven wire input coder 128, which is a parallel-to-serial signal converter, from an electronic selector and at the far end in a decoder 129, which is a serial-to-parallel signal converter, suitable for use with the fan circuit 124.

Other variations of this basic circuit will be apparent to those skilled in the art. All of these circuits are characterized by the use of a selector feeding into circuits which eventually transmit signals to a 16 or 17 wire plural wire multiple used to operate that one of a large plurality of readout devices multipled thereto which has been marked for operation by the sequence means.

FIG. 18 is a diode matrix translator used to translate some fifty incoming information character signals into a 7 wire transmission. At the left is a representation of an electromechanical selector operating thirty-two contact makers (the shift contact here counted as a contact maker) and having the conventional universal contacts.

By way of example, when the code for U or the code for ¼ comes in (see FIG. 3), circuits through diodes 130, 131, 132 and 133 are effective to cause the operation of relays 134, 135 and 136. If the incoming code has no element in the sixth place, then these three relays 134, 135 and 136 alone are operated. If the incoming code (for ¼) has an element in the sixth place, then the shift contact of the selector will be operated and consequently the relay 137 will also be operated.

FIG. 19 is a conventional fan circuit by which a seven wire multiple may be terminated and used as a translator having an output like that of the electromechanical selector of FIG. 18 or those designated editing tickers in FIG. 1. The thirty-two outputs are shown and each is marked by an upper case designation or a lower case designation or both. Differentiation between letters and figures is made by the incoming relay EL–6 which controls the operation of the category relays TR.

Thus, when the letter U is transmitted by the code 1, 2 and 3, the relays EL–1, EL–2 and EL–3 will be operated. This will result in a first circuit from ground, the closure of the normally open contact of relay EL–1, relay EL–2, diode 138 and the normally closed contact of relay EL–5. A second circuit may then be traced from ground, the normally open contact, now closed, of relay EL–2, relay F–5, diode 139 and the normally open contact, now closed, of relay EL–3. With relays F–2 and F–5 operated, the output for figures ¼ and for letters U will be closed. When the code is 1, 2 and 3, as assumed, no one of the transfer relays will be operated and the letter U will be effectively transmitted. If, on the other hand, the code 1, 2, 3 and 6 had been sent, then the relay EL–6 in addition would have been operated, resulting in the operation of the transfer relays whereby the character figures ¼ would have been effectively transmitted, for the wire marked ¼, U, is extended through an armature of one of the transfer relays to be extended through the back contact thereof to an encoder for the character U and through a front contact thereof to an encoder for the underlined character 2, which is the equivalent of the character ¼ as printed by the ticker.

What is claimed is:

1. The combination of a serial to parallel converter having a plurality of contact makers selectively responsive to time spaced coded signals, said converter having a control contact responsive to each said code of signals to count the number of codes received by said converter, said converter being located at a first given location and a bank of a plurality of readout devices at a distant location, each said readout device consisting of a given number of display areas having a display producing means for each said area, an electrical means for selectively operating each said display producing means, an operating conductor connected to each said electrical means, the said operating conductors of a plurality of said readout devices being connected in multiple and constituting a plural wire multiple, said plural wire multiple containing in addition to said operating conductors also control conductors connected to said control contact of said converter at said first location, said plural wire multiple extending between said two locations, said serial to parallel converter having as a part thereof a 1 to n converter connected between each of said contact makers and a different plurality of said operating conductors of said plural wire multiple to operate said readout devices differently for each said contact maker, means for conditioning each said readout device sequentially and means including said control conductors in said plural wire multiple for operating said conditioning means simultaneously with the operation of another of said contact makers to produce a display of said areas in a characteristic pattern corresponding to each of said selectively operated contact makers.

2. The combination set forth in claim 1 characterized by the provision of a plurality of banks of readout devices at a plurality of distant locations each of said distantly located banks of readout devices having a means operated over said control wire for conditioning the said devices of a bank in sequence.

3. The combination set forth in claim 2 characterized by the provision of a master relay for each wire of the said plural wire multiple for the application thereto of battery potential at the transmitting end thereof and the provision of a receiving relay for each wire of said plural wire multiple at each said distant location.

4. The combination set forth in claim 3 characterized by the provision of unidirectional connections for said paths between said contact makers and said conductors of said plural wire multiple.

5. The combination set forth in claim 4 characterized by the use of diodes to provide the unidirectional characteristics of said connections between said contact makers and said wires of said plural wire multiple.

6. The combination set forth in claim 2 characterized by the use of a second electrical coil for restoring each said display producing means, said restoring coils being operated by said sequence means a predetermined number of display devices ahead of that one of said display devices conditioned for operation by said sequence means and said sequence means being arranged to operate the first of said devices again following the operation of the last thereof.

7. The combination set forth in claim 2 characterized by the provision of means in said serial to parallel converter responsive to a plurality of incoming codes to operate each of said contact makers, the said plurality of incoming codes for operating each of said contact makers differing in a characteristic manner, a category indicator relay being provided and being responsive to said characteristic difference in said incoming codes, said category indicator relay controlling the connections between said contact makers and said 1 to $n$ converters whereby each said contact maker may transmit a plurality of parallel display codes, said category indicator relay additionally transmitting signals over said control wires to affect said sequence means.

8. The combination set forth in claim 7 characterized by the provision of means responsive to the operation or to the release of said category indicator relay for transiently placing a sequence means operating signal on said control conductor to advance said sequence means, said transient signal being displaced in time from said counting signals whereby said display device will not be conditioned for operation simultaneously with the transmission of said transient signal.

9. The combination of a plurality of contact makers separately and selectively responsive to codes of timed spaced signals, a matrix of unidirectional connections, a means also responsive to said codes of signals for counting the number of said codes, said last means including a contact maker closed once for each incoming code, said contact makers and said matrix of unidirectional connections being at a central location, a plural wire multiple including a control wire for said code counting contact maker extending from said central location to a plurality of distant locations, said matrix of unidirectional connections at said central location interconnecting said contact makers and the wires of said plural wire multiple to place signals from a first characteristic battery potential on the wires of said multiple in different combinations for each said contact maker, a plurality of monogram display devices at each of said distant locations each having a plurality of operating elements having individual terminals multipled to the wires of said plural wire multiple and a means at each said distant location responsive to said code counting contact at said central location for applying a second characteristic battery potential to a terminal common to said operating elements to condition said monogram display devices sequentially for operation, said characteristic battery potentials being simultaneously applied to a sequentially conditioned one of said devices at each of said distant locations for operating the elements thereof in accordance with the signals selectively applied to said wires of said plural wire multiple.

References Cited in the file of this patent
UNITED STATES PATENTS

| | | |
|---|---|---|
| 2,146,576 | Haselton et al. | Feb. 7, 1939 |
| 2,199,824 | Kinkead | May 7, 1940 |
| 2,336,897 | Shipton | Dec. 14, 1943 |
| 2,871,462 | Eggensperger et al. | Jan. 27, 1959 |
| 3,011,153 | Haselton et al. | Nov. 28, 1961 |